(12) United States Patent
Kuckelkorn et al.

(10) Patent No.: US 7,909,029 B2
(45) Date of Patent: Mar. 22, 2011

(54) RADIATION SELECTIVE ABSORBER COATING FOR AN ABSORBER PIPE, ABSORBER PIPE WITH SAID COATING, AND METHOD OF MAKING SAME

(75) Inventors: Thomas Kuckelkorn, Weiden (DE); Wolfgang Graf, Eschbach (DE); Christina Hildebrandt, Freiburg i. Brsg. (DE); Andreas Georg, Freiburg (DE)

(73) Assignee: Schott AG, Mainz (DE)

( * ) Notice: Subject to any disclaimer, the term of this patent is extended or adjusted under 35 U.S.C. 154(b) by 158 days.

(21) Appl. No.: 11/944,943

(22) Filed: Nov. 26, 2007

(65) Prior Publication Data

US 2008/0121225 A1    May 29, 2008

(30) Foreign Application Priority Data

Nov. 27, 2006    (DE) .................. 10 2006 056 536

(51) Int. Cl.
*F24J 2/24*    (2006.01)
(52) U.S. Cl. ........ 126/651; 126/635; 126/652; 126/694; 126/907; 428/220; 428/621; 428/702; 359/885
(58) Field of Classification Search .................. 126/635, 126/694, 907, 652; 427/250; 428/220, 702
See application file for complete search history.

(56) References Cited

U.S. PATENT DOCUMENTS

| | | | | |
|---|---|---|---|---|
| 3,990,914 A | * | 11/1976 | Weinstein et al. ............ | 136/246 |
| 5,460,163 A | * | 10/1995 | Goebel ........................ | 126/635 |
| 5,523,132 A | * | 6/1996 | Zhang et al. ................. | 428/34.4 |
| 6,128,126 A | * | 10/2000 | Hohenegger et al. ......... | 359/360 |
| 6,933,066 B2 | * | 8/2005 | Nagaraj et al. ............... | 428/701 |
| 2002/0073988 A1 | * | 6/2002 | Reichert et al. .............. | 126/676 |
| 2005/0139210 A1 | | 6/2005 | Eickhoff | |
| 2005/0189525 A1 | * | 9/2005 | Kuckelkorn et al. ......... | 252/582 |
| 2005/0207002 A1 | * | 9/2005 | Liu et al. ...................... | 359/359 |

(Continued)

FOREIGN PATENT DOCUMENTS

CN         1512119         7/2004

(Continued)

OTHER PUBLICATIONS

Michael Lanxner and Zvi Elgat: "Solar Selective Absorber Coating..." SPIE vol. 1272 Optical Material Technology for Energy Efficiency and Solar Energy Conversion IX, 1990, pp. 240-248 (In English).

(Continued)

*Primary Examiner* — Steven B McAllister
*Assistant Examiner* — Avinash Savani
(74) *Attorney, Agent, or Firm* — Michael J. Striker

(57) ABSTRACT

The radiation selective absorber coating of the invention includes two or more barrier layers arranged over each other on a substrate surface, an infrared-range reflective layer arranged on the two or more barrier layers, and at least an absorption layer arranged over the infrared-range reflective layer and a final antireflection layer arranged over the absorption layer. The absorber pipe, especially for a parabolic trough collector, is a steel pipe, on whose outer side the radiation selective absorber coating is applied. In the method of making the absorber pipe a first oxide barrier layer is provided on the outer side of the steel pipe by thermal oxidation, and then a second barrier layer, an infrared-range reflective layer, an absorption layer and a final antireflection layer are applied by gas-phase physical deposition.

22 Claims, 2 Drawing Sheets

U.S. PATENT DOCUMENTS

2006/0141265 A1 * 6/2006 Russo et al. .................. 428/426

FOREIGN PATENT DOCUMENTS

| CN | 1670446 | 9/2005 |
|---|---|---|
| DE | 101 50 738 | 5/2003 |
| DE | 10 2004 010 689 | 6/2005 |
| WO | 2005/010225 | 2/2005 |

OTHER PUBLICATIONS

C.E Kennedy: "Review of Mid- to High-Temperature Solar Selective Absorber Materials" National Renewable Energy Laboratory, Jul. 2002, pp. 1-53 (In English).

* cited by examiner

RADIATION SELECTIVE ABSORBER COATING FOR AN ABSORBER PIPE, ABSORBER PIPE WITH SAID COATING, AND METHOD OF MAKING SAME

CROSS-REFERENCE

The invention described and claimed herein below is also described in German Patent Application 10 2006 056 536.3 filed Nov. 27, 2006 in Germany, which provides the basis for a claim of priority under 35 U.S.C. 119 (a)-(d).

BACKGROUND OF THE INVENTION

1. The Field of the Invention

The present invention relates to a radiation selective absorber coating, especially for an absorber pipe of a parabolic trough collector, with an infrared-range reflective layer, an absorption layer arranged over the infrared-range reflective layer, and an antireflection layer arranged over the absorption layer.

2. The Description of the Related Art

Conventional absorber coatings applied to a substrate, especially a metal pipe, comprise an infrared-range reflective layer, a cermet layer, which provides a high absorptivity in a region of the solar spectrum, and a cover layer applied to the cermet layer, which is called an antireflective layer and is provided on the cermet layer to reduce the surface reflection because of the high refractive index of the cermet layer.

Striving to attain the highest possible energy yield is basic. The energy yield depends, among other things, on the coefficients of the absorptivity $\alpha$ and emissivity $\epsilon$. A high absorptivity ($\alpha > 95\%$) and a low emissivity ($\epsilon < 10\%$) of the absorber coating are always the goals of further improvements in the absorber coating.

Furthermore the temperature at which the parabolic trough collector operates determines the efficiency. From this standpoint the highest possible operating temperature is desired. However the service life of the layer system of the absorber coating is reduced at elevated operating temperatures because of aging and/or diffusion processes, whereby for example the absorption properties of the cermet layer and the reflectivity properties of the infrared-range reflective layer can be greatly impaired.

DE 101 50 738 C1 thus describes a radiation selective absorber coating, which exhibits no relevant color changes and thus no aging. This is achieved by providing a certain oxygen volume flow rate during applying of a third layer comprising aluminum and aluminum oxide. A final layer of $Al_2O_3$ is applied on this layer.

An absorber coating, in which several cermet layers with different metal content and thus different indices of refraction are included, is disclosed in U.S. Pat. No. 5,523,132. Since they have several different absorption maxima at different wavelengths, an improved fit to the solar spectrum should be achievable. Antidiffusion layers could be provided between the cermet layer and the IR-range reflective layer or between the cermet layer and the antireflection layer. No disclosure was made however regarding material and layer thicknesses.

A special absorber coating is disclosed in "Solar selective absorber coating for high service temperatures, produced by plasma sputtering" by Michael Lanxner and Zvi Elgat, in SPIE, Vol. 1272, Optical Materials Technology for Energy Efficiency and Solar Energy Conversion IX (1990), pp. 240 to 249. The absorber coating is applied to a steel substrate and comprises an antireflection layer made of $SiO_2$, a cermet layer made from an $Mo/Al_2O_3$ composition and an infrared-range reflective layer made from molybdenum, in which a diffusion barrier made from $Al_2O_3$ is arranged between the infrared-range reflective layer and the substrate.

DE 10 2004 010 689 B3 discloses an absorber component with a radiation selective absorber coating, which comprises a metal substrate, a diffusion barrier, a metallic reflection layer, a cermet layer and an antireflection layer. The diffusion barrier is an oxide layer, which comprises oxide components of the metal substrate.

Molybdenum is usually used for the infrared-range reflective layer. Generally the reflection properties of a molybdenum layer are not optimal so that it is desirable to use better reflecting materials.

The operating temperature of the known absorber pipe is in a range from 300° C. to 400° C. in vacuum. For the previously stated reasons it is desirable to increase the operating temperature however without for example impairing the absorption properties of the cermet layer and the reflection properties of the infrared-range reflective layer.

These endeavors are summarized in C. E. Kennedy, "Review of Mid- to High-Temperature Solar Selective Absorber Materials", a Technical Report of the National Renewable Energy Laboratory, Report, of July 2002. From that a layer structure comprising an absorption layer composed of $ZrO_xN_y$ or $ZrC_xN_y$ and an IR-range reflective layer made from Ag or Al, is known, which has improved temperature stability in air because of the introduction of an $Al_2O_3$-diffusion barrier. Furthermore it was established that the temperature stability of the IR-range reflective layer in vacuum is improved by the insertion of the diffusion barrier under this layer. The suggested layer materials for the diffusion barrier are $Cr_2O_3$, $Al_2O_3$, or $SiO_2$. Because of this diffusion barrier the temperature at which the silver reflective layer is stable was increased to 500° C.

However the possibilities for further improvements in both absorption and emission properties for stable coating layers have not been exhausted.

SUMMARY OF THE INVENTION

It is the object of the present invention to provide a radiation selective absorber coating, absorber pipes with this sort of radiation selective absorber coating and parabolic trough collectors, in which absorber pipes with this sort of absorber coating are used, which are operated economically with a long-lasting service life.

This object and others, which will be made more apparent hereinafter, are attained when the infrared-range reflective layer is arranged on at least two barrier layers.

It has been surprisingly shown that the shielding of the IR-range reflective layer from the substrate by a two-layer barrier effectively prevents the thermally dependent diffusion of the substrate material, especially of iron from steel absorber pipes, into the IR-range reflective layer and thus increases the long-time temperature stability of the coating.

This is especially successful when the two-layer barrier comprises a first barrier layer made by thermal oxidation advantageously of the substrate and a second barrier layer comprising $Al_xO_y$ compounds. The preferred $Al_xO_y$ compounds are $AlO$, $AlO_2$, and $Al_2O_3$. $Al_2O_3$ is particularly preferred.

In a preferred embodiment an additional barrier layer is arranged between an absorption layer comprising a cermet material and an IR-range reflective layer, which are applied over the two-layer barrier. The additional barrier layer preferably comprises another $Al_xO_y$ layer, in which x=1 or 2 and y=1, 2, or 3.

The embedding of the infrared-range reflective layer between two aluminum oxide layers and the formation of a sandwich structure in connection with it has the advantage that no material from the infrared-range reflective layer can diffuse into the absorption layer above it and in this way impair the absorption properties of the absorption layer. The comprehensive prevention of diffusion within the layer system, especially in or from the infrared-range reflective layer and in the cermet absorption layer can thus be guaranteed.

For the first time in this way a high absorption with $\alpha > 95.5\%$ and a low emissivity with $\epsilon < 9\%$ is obtained for an operating time of 250 hours at an operating temperature of 550° C. in vacuum. Because of that the efficiency of a collector with an absorber pipe provided with this coating may be improved in a two-fold manner: the improved selectivity ratio $\alpha/\epsilon > 0.95/0.1$ means a higher yield for the radiation energy and an increased operating temperature permits an efficient conversion into electrical energy. The long service life of this sort of coating guarantees the efficient operation of an appropriate parabolic trough collector with this sort of absorber pipe coating.

The high temperature resistance of the absorber coating permits the use of an economical heat-carrying medium. Up until the present invention expensive special oils were used as heat-carrying media, which are only stable up to about 400° C. The high temperature stability of the absorber coating now allows operating temperatures for the absorber pipe of >450° C. to 550° C.

In preferred embodiments a heat-carrying medium can be used with a boiling point <110° C. Water is particularly preferred as the heat-carrying medium. The steam, which arises at the high operating temperatures, can be directly conducted into a steam turbine. Additional heat exchangers for heat transfer from the oils previously used as heat-carrying media to water are no longer required so that from this standpoint a parabolic trough collector with an absorber pipe with the absorber coating according to the invention can be operated more economically than the current parabolic trough collectors.

An additional advantage is that the flow rate of the heat-carrying medium through the absorber pipe can be lowered, since a higher operating temperature is permissible for the absorber pipe coating without any disadvantages. In this way some of the energy used for operation of the pumps of a parabolic trough collector can be saved.

Preferably the thickness of the aluminum oxide layers is between 20 and 100 nm. At thicknesses of less than 20 nm the barrier action of the aluminum oxide layer is no longer satisfactory according to the composition of the adjacent layer. At thicknesses of more than 100 nm thermal stresses occur, which could lead under certain circumstances to loosening of the layer.

The thicknesses of both aluminum oxide layers can be different. The thickness of the lower aluminum oxide layer is preferably greater than the thickness of the upper aluminum oxide layer. Preferably the layer thickness of the aluminum oxide layer, which is arranged between the substrate and the IR-range reflective layer, is from 20 to 100 nm, preferably 50 to 70 nm. The layer thickness of the aluminum oxide layer, which is arranged between the IR-range reflective layer and the absorption layer, is preferably 0 nm to 50 nm, and preferably from 30 nm to 40 nm or also from 5 nm to 15 nm according to the composition of the layers.

The embedding of the IR-range reflective layer between the two aluminum oxide layers has the additional advantage that materials, such as silver, copper, platinum or gold, can be used for this layer, which has the advantage of course that diffusion of molybdenum is reduced but also the decisive advantage that reflectivity in the IR-range is clearly improved so that an emissivity $\epsilon < 10\%$ is attainable.

The thickness of the infrared-range reflective coating is from 50 nm to 150 nm according to the type of the material used. A layer thickness of 100 nm to 120 nm is preferred when copper or silver is used. A layer thickness in a range of from 90 nm to 130 nm is preferred when using silver. In other cases the layer thickness of 50 to 100 nm, especially of 50 to 80 nm, is preferred.

These lower layer thicknesses of the infrared-range reflective layer are thus allowed because the materials of the layer, namely gold, silver, platinum and copper, have a clearly higher reflectivity, cannot diffuse across the layer into other layers because the layer is packed between two aluminum oxide layers and other interfering elements do not impair their positive properties by diffusion.

The high prices of the noble metals, Au, Ag and Pt, can be compensated by the clearly lower layer thickness in comparison to known layer thicknesses for the infrared-range reflecting layer, partially even over-compensated.

The thickness of the absorption layer is preferably from 60 to 140 nm. The absorption layer is preferably a cermet layer of aluminum oxide with molybdenum or zirconium oxide with molybdenum. Instead of a uniform absorption layer several absorption layers of different composition can be provided, especially with decreasing metal content, or a gradually changing absorption layer. Preferably the cermet layer is a gradient layer, which means a layer in which the metal content within the layer increases or decreases continuously, but in practice also stepwise.

The layer thickness of the antireflection layer arranged on the absorption layer is preferably from 60 to 120 nm. This layer preferably comprises silicon oxide or aluminum oxide.

An absorber pipe according to the invention, especially for a parabolic trough collection, comprises a steel pipe, on whose outer side at least an IR-range reflective layer, an absorption layer, especially made of cermet material, and an antireflective layer, which is applied to the cermet layer, is characterized in that the infrared-range reflective layer is arranged between two $Al_xO_y$ layers, in which x=1 or 2 and y=1, 2, or 3.

A method according to the invention for operating a parabolic trough collector with an absorber pipe, through which a heat-carrying medium is conducted and which has a radiation selective absorber coating, which comprises at least an infrared-range reflective layer, an absorption layer, especially made of cermet material, and an antireflective layer, in which the infrared-range reflective layer is arranged between two $Al_xO_y$ layers, in which x=1 or 2 and y=1, 2, or 3, comprises conducting a heat-carrying liquid with a boiling point of less than 110° C. through the absorber pipe.

In a preferred embodiment of this method water is used as the heat-carrying liquid.

According to a preferred embodiment the method of operating the parabolic trough collector is conducted so that the operating temperature of the absorber pipe is set at 450° C. to 550° C., especially to 480° C. to 520° C.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1:
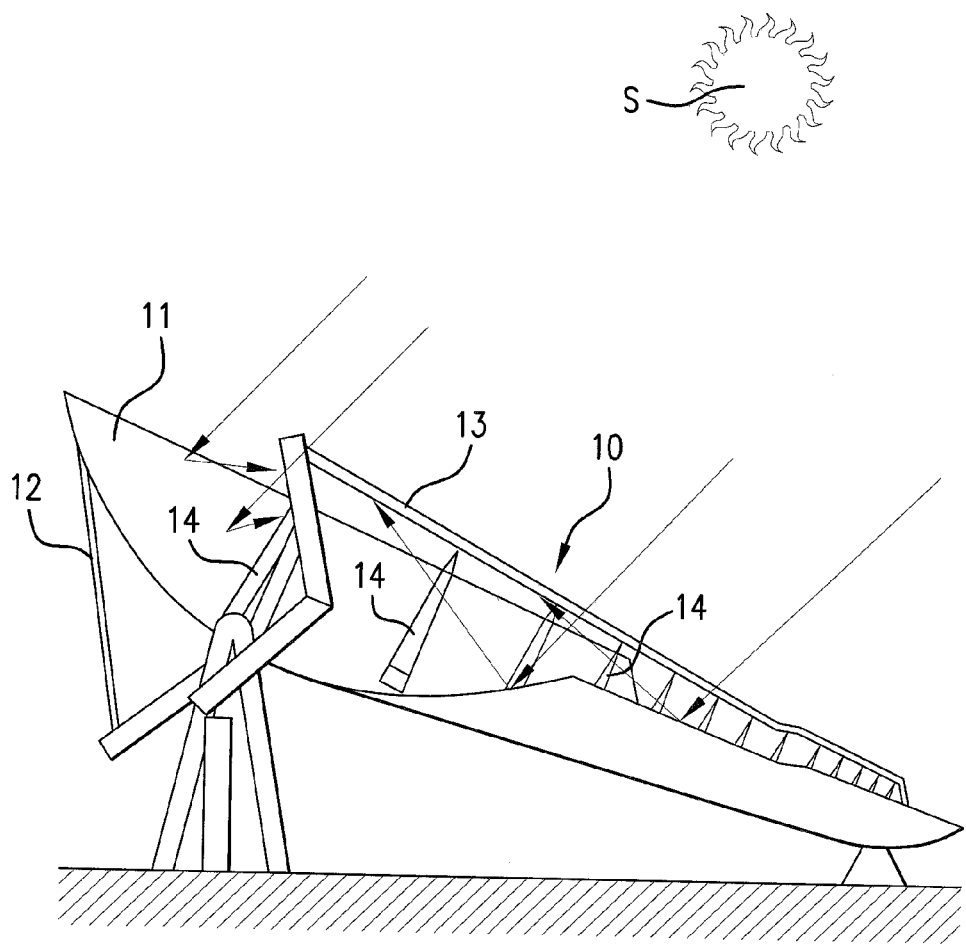
FIG. 1 is a perspective view of a parabolic rough collector including the absorber pipe with the radiation selective absorber coating according to the present invention.

A parabolic trough collector, which has a longitudinally extending parabolic reflector 11 with a parabola-shaped cross-section, is shown in FIG. 1. The parabolic reflector 11 is held in position by a supporting structure 12. An absorber pipe 13, which is mounted on supports 14 connected in the parabolic trough collector, extends along the focal line of the parabolic reflector 11. The parabolic reflector 11, the supports 14 and the absorber pipe 13 form a unit, which pivots about the axis of the absorber pipe 13 and is guided about this single axis to track the position of the sun. The parabolic reflector 11 focuses the incident parallel solar radiation from the sun on the absorber pipe 13. A heat-carrying medium, especially water, flows through the absorber pipe 13, and is heated up by the absorbed solar radiation. The heat-carrying medium emerges from the outlet end of the absorber pipe 13 and is supplied to an energy consumer or converter.

Figure 2:
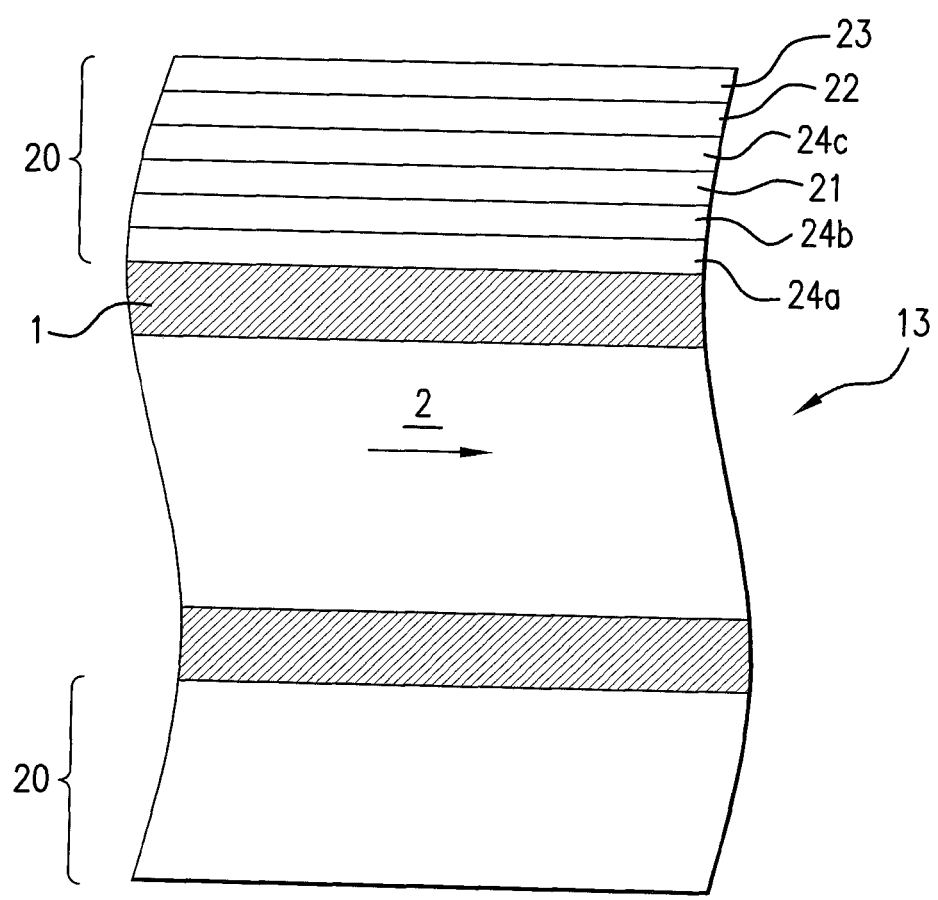
FIG. 2 is a cutaway longitudinal cross-sectional view through an absorber pipe with the radiation selective absorber coating according to the present invention.

FIG. 2 is a schematic sectional view through an absorber pipe 13 according to the invention. The absorber pipe 13 comprises a steel pipe 1, which acts as a substrate for an absorber coating 20 applied to the outer surface of the pipe 1. The coating thickness of each individual layer of the absorber coating 20 is shown much greater than it actually is in order to simplify the illustration. Also the thickness of each individual layer is not necessarily the same for all layers, as shown in FIG. 2.

The absorber coating 20 comprises, from the innermost layer applied to the steel pipe 1 to the outermost, a first barrier or diffusion-blocking layer 24a of iron-chromium oxide produced by thermal oxidation; a second preferably aluminum oxide barrier layer 24b; an infrared-range reflective layer 21 made of gold, silver, platinum, or copper; a third preferably aluminum oxide barrier layer 24c; a cermet layer 22 applied on the third barrier layer; and finally an antireflection layer 23 applied over the cermet layer 22.

The process described herein below produces the absorber pipe with the absorber coating 20 according to the embodiment shown in FIG. 2.

The steel pipe 1, preferably a stainless steel pipe, is polished and subsequently cleaned. Preferably it is polished until the surface roughness $R_a$ is less than 0.2 µm. Subsequently the stainless steel pipe is thermally oxidized at a temperature greater than 400° C. for about a half an hour to 2 hours, especially for about an hour at 500° C. An oxide layer with a thickness of from 15 nm to 50 nm, preferably from 30 nm±10 nm, is produced by the thermal oxidation. This oxide layer is the first barrier layer 24a.

Subsequently the steel pipe 1 is placed in a vacuum coating unit and the unit is evacuated. After achieving a pressure of less than $5\times10^{-4}$ mbar, preferably $1\times10^{-4}$ mbar, the following layers are applied by means of gas-phase physical deposition (PVD), especially by means of cathodic sputtering. Moreover the rotating steel pipe is guided past the sputtering source, i.e. the target comprising the coating substance, for example Al, Ag, and Mo.

The second barrier coating 24b is applied in the form of an $Al_xO_y$ layer in a first deposition step, in which the aluminum deposited by evaporation or sputtering is reacted with oxygen. The oxygen pressure during this step is between $10^{-2}$ mbar and $10^{-3}$ mbar, preferably 4 to $7\times10^{-3}$ mbar. The preferred layer thickness of this second barrier layer is between 30 nm and 65 nm, and especially 50 nm±10 nm.

The infrared-range reflective layer 21 is applied in a second deposition step, in which gold, silver, platinum, or copper, preferably silver, is deposited with a thickness of 90 nm to 130 nm, preferably of 110 nm±10 nm, on the second barrier layer 24b.

The third barrier layer 24c is applied over the infrared-range reflective layer 21 in a following second deposition step, in which aluminum is evaporated as in the case of the second barrier layer and reacted with oxygen. The preferred coating thickness of this third barrier layer is at most 50 nm, especially preferably 10 nm±5 nm. However this barrier layer can be completely omitted, since it has been shown that with suitable composition the absorption layer 22 applied on the reflective layer 21 must block diffusion, not blocked by the additional barrier layer.

The absorption layer 22, or more precisely the cermet layer, is applied by simultaneous evaporation/sputtering of aluminum and molybdenum from a common crucible or from two separate targets in a fourth deposition step. Preferably oxygen is simultaneously conducted into the evaporation/sputtering region, in order to deposit (reactively) aluminum oxide besides aluminum and molybdenum.

The composition of the layer deposited in the fourth deposition step can be varied even in the course of the coating process so that it is variably adjusted by suitable selection of the operating parameters, such as the evaporation/sputtering rates and the oxygen amount or flow rate. Especially using separate targets the fraction of the molybdenum deposited can be varied in relation to the fraction of the aluminum or the fraction of the aluminum oxide deposited in the absorption layer 22. In other words, a gradient of the molybdenum concentration is produced in the absorption layer 22; preferably the molybdenum fraction is decreased during the formation of the absorption layer 22. Preferably the amount of molybdenum in the absorption layer 22 is from 25 vol. % to 70 vol. %, especially preferably 40±15 vol. %, and decreases toward the outside of the absorber pipe to 10 vol. % to 30 vol. %, especially preferably 20±vol. %.

Oxygen is preferably provided in amounts that are below the stoichiometric amount in relation to the fraction of the aluminum deposited, so that a certain fraction of the aluminum deposited in the absorption layer 22 remains as metallic aluminum, which is not oxidized. This fraction of metallic aluminum is thus available as a potential redox agent or oxygen getter, so that molybdenum oxide is not formed. The not oxidized aluminum fraction should amount to preferably under 10 vol. %, especially preferably between 0 and 5 vol. %, in relation to the total composition of the absorption layer 22. The not oxidized aluminum fraction can similarly be varied within the absorption layer by changing the operating parameters, namely the evaporation rate and the oxygen flow rate.

The absorption coating 22 is applied preferably with a thickness of 70 nm to 140 nm, especially preferably 100±10 nm.

The antireflection layer 23 is applied in the form of an $SiO_2$ layer in a fifth deposition step, in which silicon is deposited in a gas-phase physical deposition while oxygen is supplied. The preferred antireflection layer 23 deposited in this manner has a thickness of 70 nm to 110 nm, especially preferably 90±10 nm.

An absorber pipe produced in this way was heated in a vacuum heating unit at 550° C. for 250 h. The pressure in the vacuum chamber was less than $1\times10^{-4}$ during this heating process. After cooling the sample to 100° C. the vacuum chamber was aerated and the sample was removed. The sample was subsequently tested spectrophotometrically. It had an integrated solar absorptivity of 95.5±0.5% for a solar spectrum 1.5 AM direct and a wavelength range of 350 to 2500 nm. The thermal emissivity was 8%±2% for a substrate temperature of 400° C. The thermal emissivity calculated from the spectral measurement was subsequently tested by a heat loss measurement, in which the coated absorber pipe was equipped with an evacuated tubular jacket and heated from the inside. The calculated emissivity could be reported with a precision of ±1% by the heat loss measurement.

While the invention has been illustrated and described as embodied in a radiation selective absorber coating for an absorber pipe, absorber pipe with said coating, and method of making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An absorber pipe (13), especially for a parabolic trough collector, said absorber pipe (13) comprises a steel pipe (1) with an outer surface and a radiation selective absorber coating on said outer surface of said steel pipe (1);
    wherein said radiation selective absorber coating comprises at least two barrier layers (24a, 24b) arranged over each other on said outer surface of said steel pipe (1), an infrared-range reflective layer (21) arranged on said at least two barrier layers (24a, 24b), an absorption layer (22) arranged over said infrared-range reflective layer (21) and an antireflection layer (23) arranged over said absorption layer (22); and
    wherein said at least two barrier layers comprise a first barrier layer (24a) and a second barrier layer (24b), said first barrier layer (24a) consists of oxidized components the steel pipe and is made by thermal oxidation of the steel and said second barrier layer (24b) consists of at least one aluminum oxide compound and said at least one aluminum oxide compound are each of the formula $Al_xO_y$ layer, wherein x=1 or 2 and y=1, 2, or 3.

2. A method of making an absorber pipe (13), said method comprising the steps of:
    a) providing a first oxide barrier layer (24a) on an outer surface of a steel pipe (1) by thermal oxidation, said first barrier layer (24a) consisting of oxidized components of the steel pipe;
    b) applying a second barrier layer (24b) over said first oxide barrier layer (24a) by a gas-phase physical deposition (PVD) of aluminum while supplying oxygen, said second barrier layer (24b) consists of at least one aluminum oxide compound and said at least one aluminum oxide compound are each of the formula $Al_xO_y$, wherein x=1 or 2 and y=1, 2, or 3;
    c) applying an infrared-range reflective layer (21) over the second barrier layer (24b) and the first barrier layer (24a) by a gas-phase physical deposition of a metal selected from the group consisting of gold, silver, platinum and copper;
    d) applying an absorption layer (22) over the infrared-range reflective layer (21) by a simultaneous gas-phase deposition of aluminum and molybdenum; and
    e) applying an antireflection layer (23) over the absorption layer (22) by a gas-phase physical deposition of silicon while supplying oxygen.

3. The method as defined in claim 2, further comprising polishing said outer surface of said steel pipe (1) prior to said thermal oxidation, so that, after said polishing, said outer surface of said steel pipe has a surface roughness ($R_a$) of less than 0.2 μm.

4. The method as defined in claim 2, wherein said first barrier layer (24a) has a thickness of 15 nm to 50 nm after the providing of the first barrier layer (24a).

5. The method as defined in claim 2, wherein said gas-phase physical deposition of said second barrier layer (24b) is performed at a pressure of less than $5 \times 10^{-4}$ mbar.

6. The method as defined in claim 2, wherein said gas-phase physical deposition of said second barrier layer (24b) comprises a sputtering process and said steel pipe is guided rotating past a sputtering source during said sputtering process.

7. The method as defined in claim 2, wherein said second barrier layer (24b) has a thickness of 30 nm to 65 nm after the applying of the second barrier layer (24b).

8. The method as defined in claim 2, wherein said infrared-range reflective layer (21) consists of a silver layer with a thickness of 90 nm to 130 nm.

9. The method as defined in claim 2, further comprising applying an additional barrier layer (24c) by another gas-phase physical deposition after the applying of the infrared-range reflective layer (21) and wherein said additional barrier layer (24c) has a thickness less than or equal to 50 nm.

10. The method as defined in claim 2, wherein said simultaneous gas-phase physical deposition of said aluminum and said molybdenum in said absorption layer (22) takes place while supplying oxygen.

11. The method as defined in claim 10, wherein said oxygen is supplied in an amount that is less than stoichiometric in relation to said aluminum deposited in said absorption layer (22), so that at least some of said aluminum is present in a not oxidized state in said absorption layer (22), and said aluminum in said not oxidized state is present in said absorption layer (22) in an amount less than 10 vol. % of said absorption layer (22).

12. The method as defined in claim 2, wherein said absorption layer (22) has a thickness of 70 nm to 140 nm; said simultaneous gas phase deposition of said aluminum and said molybdenum takes place so that a deposited molybdenum fraction is varied relative to a deposited aluminum fraction and/or a deposited aluminum oxide fraction during said simultaneous gas phase deposition; and said deposited molybdenum fraction in said absorption layer (22) is reduced from 30 vol. % to 70 vol. % of said absorption layer (22) to from 10 vol. % to 30 vol. % in said absorption layer (22) in a direction toward said outer surface of said coating.

13. A method of operating a parabolic trough collector, said parabolic trough collector comprising an absorber pipe (13) through which a heat-carrying medium is conducted, wherein said absorber pipe (13) is a steel pipe (1) and has a radiation selective absorber coating (20) on an outer side thereof and said radiation selective absorber coating (20) comprises at least two barrier layers (24a, 24b) arranged over each other on said outer side, an infrared-range reflective layer (21) arranged on said at least two barrier layers (24a, 24b), an absorption layer (22) arranged over said infrared-range reflective layer (21) and an antireflection layer (23) arranged over said absorption layer (22); and wherein said at least two barrier layers comprise a first barrier layer (24a) and a second barrier layer (24b), said first barrier layer (24a) consists of oxidized components of the absorber pipe and is made by thermal oxidation of the absorber pipe, said second barrier layer (24b) consists of at least one aluminum oxide compound and said at least one aluminum oxide compound are each of the formula $Al_xO_y$, wherein x=1 or 2 and y=1, 2, or 3; and said wherein said method comprises conducting a heat-carrying liquid with a boiling point less than 110° C. through the absorber pipe (13).

14. The method as defined in claim 13, wherein said heat-carrying liquid is water.

15. The method as defined in claim 13, wherein said absorber pipe (13) has an operating temperature that is adjusted to from 450° C. and 550° C.

16. The absorber pipe (13) as defined in claim 1, wherein said absorption layer (22) consists of cermet material.

17. The absorber pipe (13) as defined in claim 1, wherein said infrared-range reflective layer (21) has a thickness of 50 nm to 150 nm.

18. The absorber pipe (13) as defined in claim 1, wherein said infrared-range reflective layer (21) is made of a metal selected from the group consisting of gold, silver, platinum and copper; said thickness of said infrared-range reflective layer (21) is from 90 nm to 130 nm when said metal is said silver; and said thickness of said infrared-range reflective layer (21) is from 100 to 120 nm when said metal is said copper.

19. The absorber pipe (13) as defined in claim 1, wherein said first barrier layer (24a) is a member selected from the group consisting of iron oxide, chromium oxide and mixed oxides of iron and chromium.

20. The absorber pipe (13) as defined in claim 10, wherein said absorption layer (22) has a thickness of 60 nm to 140 nm and said antireflection layer (23) has a thickness of 60 nm to 120 nm.

21. An absorber pipe (13), especially for a parabolic trough collector, said absorber pipe (13) comprises a steel pipe (1) with an outer surface and a radiation selective absorber coating on said outer surface of said steel pipe (1);
wherein said radiation selective absorber coating comprises at least two barrier layers (24a, 24b) arranged over each other on said outer surface of said steel pipe (1), an infrared-range reflective layer (21) arranged on said at least two barrier layers (24a, 24b), an absorption layer (22) arranged over said infrared-range reflective layer (21) and an antireflection layer (23) arranged over said absorption layer (22);
wherein said radiation selective absorber coating includes an additional barrier layer (24c) arranged between the infrared-range reflective layer (21) and the absorption layer (22);
wherein said at least two barrier layers comprise a first barrier layer (24a) and a second barrier layer (24b), said first barrier layer (24a) consists of oxidized components of the steel pipe and is made by thermal oxidation of the steel pipe and said second barrier layer (24b) consists of at least one aluminum oxide compound and said at least one aluminum oxide compound are each of the formula $Al_xO_y$, wherein x=1 or 2 and y=1, 2, or 3; and
wherein said additional barrier layer (24c) comprises at least one other aluminum oxide compound and said at least one other aluminum oxide compound are each of the formula $Al_xO_y$, wherein x is 1 or 2 and y is 1, 2, or 3.

22. The absorber pipe (13) as defined in claim 21, wherein said second barrier layer (24b) has a thickness between 20 nm and 100 nm, said additional barrier layer (24c) has a thickness between 5 nm and 50 nm, and said thickness of said second barrier layer (24b) is greater than said thickness of said additional barrier layer (24c).

* * * * *